(12) United States Patent
Grover

(10) Patent No.: US 11,477,520 B2
(45) Date of Patent: Oct. 18, 2022

(54) CONTENT-MODIFICATION SYSTEM WITH VOLUME-LEVEL DETECTION FEATURE

(71) Applicant: Roku, Inc., San Jose, CA (US)

(72) Inventor: Matthew George Grover, Cardiff (GB)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/351,976

(22) Filed: Jun. 18, 2021

(65) Prior Publication Data

US 2022/0256233 A1 Aug. 11, 2022

Related U.S. Application Data

(60) Provisional application No. 63/148,268, filed on Feb. 11, 2021.

(51) Int. Cl.
*H04N 21/439* (2011.01)
*H04N 21/258* (2011.01)
*H04N 21/442* (2011.01)
*H04N 21/81* (2011.01)
*H04N 21/44* (2011.01)

(52) U.S. Cl.
CPC ... *H04N 21/4394* (2013.01); *H04N 21/25883* (2013.01); *H04N 21/44016* (2013.01); *H04N 21/44204* (2013.01); *H04N 21/812* (2013.01)

(58) Field of Classification Search
CPC ......... H04N 21/4394; H04N 21/25883; H04N 21/44016; H04N 21/44204; H04N 21/812
USPC .......................................................... 725/18
See application file for complete search history.

(56) References Cited

U.S. PATENT DOCUMENTS

| | | | | |
|---|---|---|---|---|
| 2003/0121037 A1* | 6/2003 | Swix | ................... | H04N 21/4758 348/E7.063 |
| 2004/0073919 A1* | 4/2004 | Gutta | ................. | H04N 21/4668 725/35 |
| 2009/0172723 A1* | 7/2009 | Shkedi | ................. | H04N 21/812 725/32 |
| 2014/0075463 A1* | 3/2014 | Kamdar | ............... | H04N 21/439 725/32 |

(Continued)

FOREIGN PATENT DOCUMENTS

KR 20150132451 A * 11/2015

*Primary Examiner* — Cynthia M Fogg
(74) *Attorney, Agent, or Firm* — Sterne, Kessler, Goldstein & Fox P.L.L.C.

(57) ABSTRACT

Methods and systems for volume-level detection in content-modification system are disclosed. A content-modification system may make a first determination that a content-presentation device is receiving particular programming content on a given channel. The particular content may include a program segment immediately followed by an advertising segment. A second determination may be made that the content-presentation device remains tuned to the given channel during a time interval spanning a transition between the program segment and the advertising segment. An indication may be received from the content-presentation device of a first volume level of audio during a portion of the time interval prior, and leading up, to the transition, and a second volume level of audio during a portion of the time interval after to the transition. A comparison of the first and second volume levels may be made, and used as a basis for selecting and scheduling future additional advertising segments.

20 Claims, 11 Drawing Sheets

(56) References Cited

U.S. PATENT DOCUMENTS

| | | | |
|---|---|---|---|
| 2014/0280879 A1* | 9/2014 | Skolicki | H04L 69/28 |
| | | | 709/224 |
| 2015/0356612 A1* | 12/2015 | Mays | G06Q 30/0241 |
| | | | 705/14.61 |
| 2016/0142767 A1* | 5/2016 | Shigeta | H04N 21/4788 |
| | | | 725/12 |
| 2016/0275544 A1* | 9/2016 | Jo | G06Q 30/0242 |
| 2017/0251253 A1* | 8/2017 | Sheppard | H04N 21/44226 |
| 2018/0352296 A1* | 12/2018 | Wowro | H04N 21/4667 |

\* cited by examiner

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | | | |
|---|---|---|---|---|---|
| T9 | | Compare first fingerprint data and second fingerprint data | | | |
| T10 | | Detect a match between first fingerprint data and second fingerprint data | | | |
| T11 | | Identify the channel on which the second content is being received | | | |
| T12 | | Generate metadata associated with the identified channel | | | |
| T13 | | Transmit an indication of the identified channel and the associated metadata | | | |
| T14 | | | | | Receive the indication of the identified channel and the associated metadata |

Figure 4B

| | | | | |
|---|---|---|---|---|
| T15 | | | | Determine historical content consumption data |
| T16 | Transmit third content | | | |
| T17 | Generate third fingerprint data and third metadata | | | |
| T18 | Transmit third fingerprint data and third metadata | | | |
| T19 | | | Receive modifiable content segment | |
| T20 | | | Generate fourth fingerprint data and fourth metadata | |
| T21 | | | Transmit fourth fingerprint data and fourth metadata | |
| T22 | | Receive third fingerprint data and third metadata | | |
| T23 | | Receive fourth fingerprint data and fourth metadata | | |

Figure 4C

| | | | | | |
|---|---|---|---|---|---|
| T24 | | Compare at least a portion of third fingerprint data and at least a portion of fourth fingerprint data | | | |
| T25 | | Detect a match between at least a portion of third fingerprint data and at least a portion of fourth fingerprint data | | | |
| T26 | | Identify an upcoming content modification opportunity on the identified channel | | | |
| T27 | | Transmit the third fingerprint data and the third metadata | | | |
| T28 | | | Receive third fingerprint data and third metadata | | |
| T29 | | | | Receive fifth content | |
| T30 | | | | Output for presentation fifth content | |

Figure 4D

| T31 | Generate fifth fingerprint data and fifth metadata | | | |
|---|---|---|---|---|
| T32 | Compare the third fingerprint data and the fifth fingerprint data | | | |
| T33 | Detect a match between the third fingerprint data and the fifth fingerprint data | | | |
| T34 | Determine modification start time and modification end time | | | |
| T35 | Transmit a request for supplemental content | | | |
| T36 | | Receive request and select supplemental content | | |
| T37 | | Transmit request for link | | |
| T38 | | | | Transmit link |

Figure 4E

| T39 | | Transmit link | | | |
|---|---|---|---|---|---|
| T40 | Receive link and retrieve supplemental content | | | | |
| T41 | Perform content modification operation | | | | |

Figure 4F

CONTENT-MODIFICATION SYSTEM WITH VOLUME-LEVEL DETECTION FEATURE

RELATED DISCLOSURES

This application claims priority under 35 U.S.C. § 119(e) to U.S. Provisional Patent Application Ser. No. 63/148,268, filed on Feb. 11, 2021, which is incorporated herein in its entirety by reference.

USAGE AND TERMINOLOGY

In this disclosure, unless otherwise specified and/or unless the particular context clearly dictates otherwise, the terms "a" or "an" mean at least one, and the term "the" means at least one.

SUMMARY

In one aspect, a method includes making a first determination in a content-modification system that a content-presentation device is receiving particular programming content on a given channel of a content-distribution system of the content-modification system, wherein the particular programming content has at least an audio-content component and comprises a program segment immediately followed by a first advertising segment; making a second determination in the content-modification system that the content-presentation device remains tuned to the given channel during a first time interval that spans a first transition between the program segment and the first advertising segment, the first time interval extending through at least a portion of the first advertising segment; receiving from the content-presentation device a first indication of both a first volume level of audio playout during a portion of the first time interval prior, and leading up, to the first transition, and a second volume level of audio playout during a portion of the first time interval after to the first transition; making a first comparison of the first volume level to the second volume level; and based on a volume factor comprising the first comparison, selecting and scheduling one or more additional advertising segments for delivery to and presentation by the content-presentation device at a time subsequent to the completion of presentation of first advertising segment.

In another aspect, a computing system of a content-modification system includes a processor and a non-transitory computer-readable storage medium, having stored thereon program instructions that, upon execution by the processor, cause performance of a set of operations. The set of operations includes: making a first determination that a content-presentation device is receiving particular programming content on a given channel of a content-distribution system of the content-modification system, wherein the particular programming content has at least an audio-content component and comprises a program segment immediately followed by a first advertising segment; making a second determination that the content-presentation device remains tuned to the given channel during a first time interval that spans a first transition between the program segment and the first advertising segment, the first time interval extending through at least a portion of the first advertising segment; receiving from the content-presentation device a first indication of both a first volume level of audio playout during a portion of the first time interval prior, and leading up, to the first transition, and a second volume level of audio playout during a portion of the first time interval after to the first transition; making a first comparison of the first volume level to the second volume level; and based on a volume factor comprising the first comparison, selecting and scheduling one or more additional advertising segments for delivery to and presentation by the content-presentation device at a time subsequent to the completion of presentation of first advertising segment.

In another aspect, a non-transitory computer-readable storage medium has stored thereon program instructions that, upon execution by one or more processors of computing system of a content-modification system, cause the computing system to carry out a set of operations. The set of operations includes: making a first determination that a content-presentation device is receiving particular programming content on a given channel of a content-distribution system of the content-modification system, wherein the particular programming content has at least an audio-content component and comprises a program segment immediately followed by a first advertising segment; making a second determination that the content-presentation device remains tuned to the given channel during a first time interval that spans a first transition between the program segment and the first advertising segment, the first time interval extending through at least a portion of the first advertising segment; receiving from the content-presentation device a first indication of both a first volume level of audio playout during a portion of the first time interval prior, and leading up, to the first transition, and a second volume level of audio playout during a portion of the first time interval after to the first transition; making a first comparison of the first volume level to the second volume level; and based on a volume factor comprising the first comparison, selecting and scheduling one or more additional advertising segments for delivery to and presentation by the content-presentation device at a time subsequent to the completion of presentation of first advertising segment.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
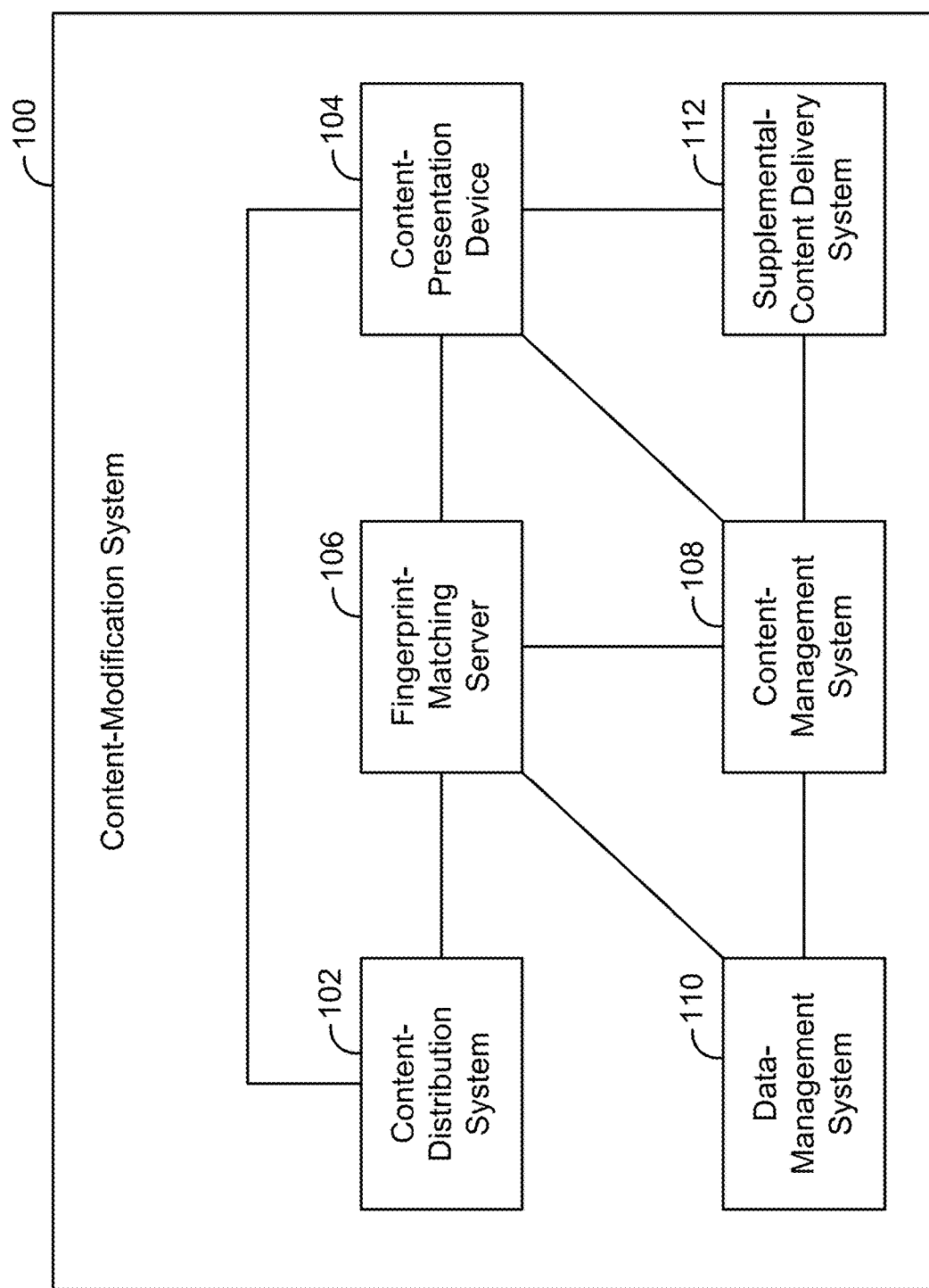
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. The described content-modification system can facilitate providing these and other related features.

In one example, the content-modification system can include a fingerprint-matching server that can identify an upcoming content-modification opportunity on an identified channel, which it can do by comparing and detecting a match between two different instances of fingerprint data. Based on the detected match, the fingerprint-matching server can then transmit fingerprint data and metadata to the content-presentation device data to facilitate preparing the content-presentation device to perform a content-modification operation in connection with the identified upcoming content-modification opportunity.

However, in other cases, it may be desirable for the content-presentation device to use one or more alternative techniques to facilitate performing a content-modification operation.

For example, the fingerprint-matching server can use broadcast-schedule data to facilitate the content-presentation device performing a content-modification operation. Among other things, this can allow the content-presentation device to facilitate performing a content-modification operation without using fingerprint data or by using fingerprint data in a more limited fashion. This can be beneficial in the case where the content-presentation device does not receive or otherwise have access to fingerprint data, or where the use of fingerprint data is undesirable for one or more reasons (e.g., because fingerprint-based techniques may be computationally expensive).

Content segments that are advertisements, whether part of an original content sequence or replacement segments, may typically be provided by way of a cost-based service of a broadcaster or other content distribution provider. Advertisers that pay for advertisements to be delivered to content-presentation devices may want to obtain information about the effectiveness of what they have paid for, as well as information that can be used to improve the effectiveness of their advertisements. For example, advertisers may want to know if users (i.e., viewers or consumers of content) are interested in the advertisements that they are watching on their content-presentation devices. This can be particularly useful when coupled with user demographics, geographic regions, or other user distribution metrics. Conventional techniques for attempting to acquire such information may involve detecting how often content-presentation devices change channels away during scheduled time slots for particular advertisements. However, this may only measure one way in which viewers can decide to not pay attention to advertisements. As such, conventional techniques fall short of providing accurate information about user interest.

Example embodiments herein describe systems and methods for using detection and analysis of user-selected audio volume levels before, during, and after presentation of advertising segments to gauge user interest in the advertising segments. Analysis of volume levels can be applied in real-time to adjust and/or control content replacement operations of individual content-presentation devices. For example, selection of particular replacement content may be revised based on real-time feedback of volume levels. Additionally or alternatively, volume-level analysis may be applied over longer time intervals, and applied to future selection and scheduling of replacement content. Further, joint analysis of volume levels with user distribution information (e.g., demographics, geography, etc.) may be applied to selection and scheduling of broader, non-individual targeting of advertising segments. Other forms of volume-level analysis and applications thereof may be used as well.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
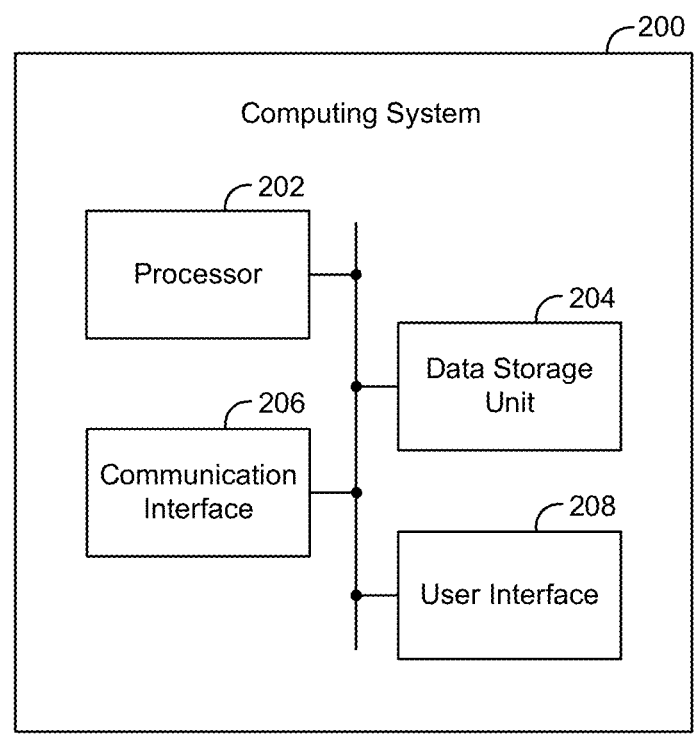
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

Figure 3:
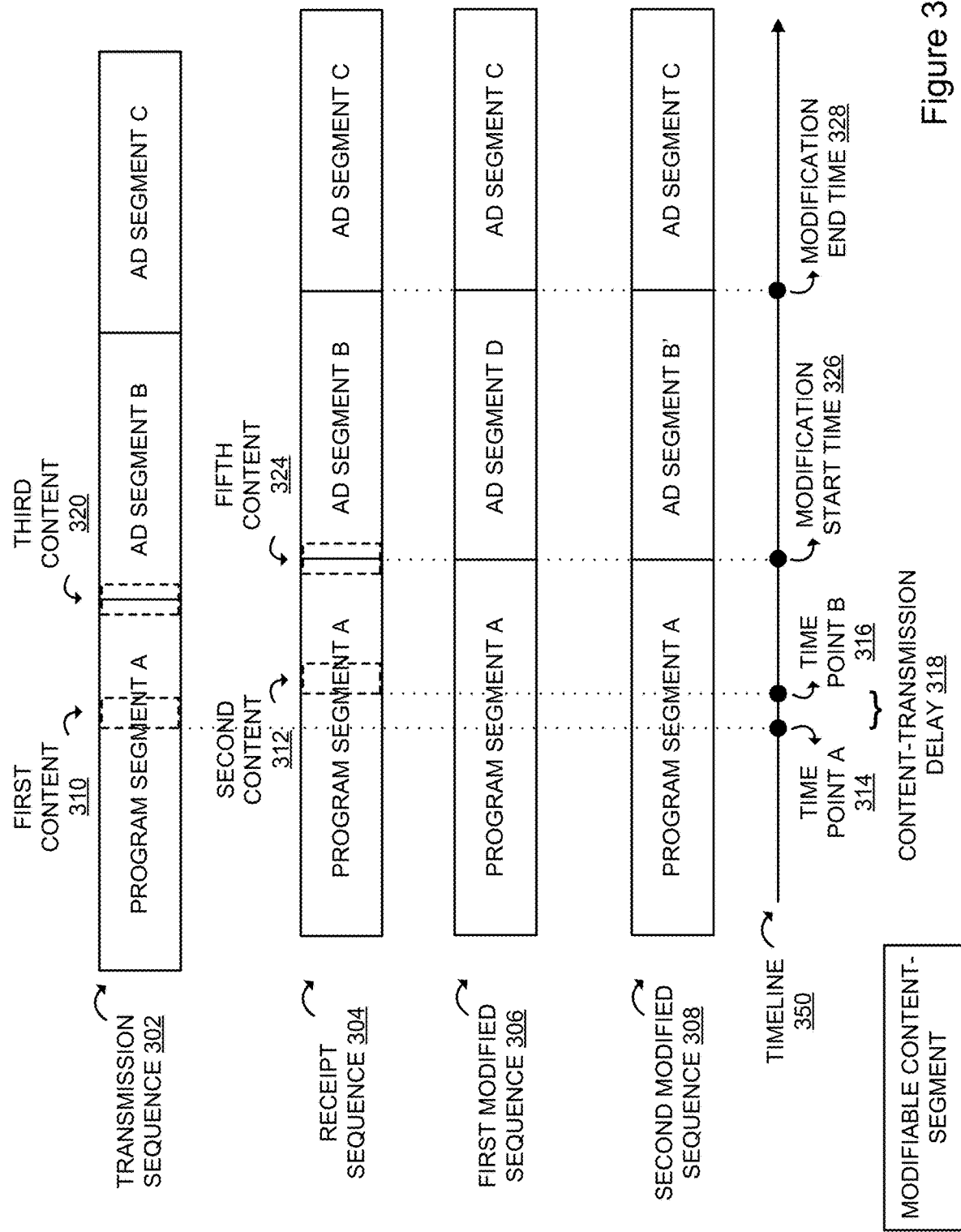
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content-presentation device 104 to overlay on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. By way of example, the content-distribution system 102 can generate the first fingerprint data by selecting multiple patches of a frame of video content and calculating a value for each of the selected multiple patches. In some instances, the values can include Haar-like features at different scales and in different locations of displayed regions of the frame of video content. Further, in some instances, the values can be derived from an integral image, which is a summed image where each pixel is a sum of values of the pixels above and to the left, as well as the current pixel. Using an integral image technique may increase the efficiency of the fingerprint generation.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. By way of example, the first fingerprint data may include a first group of fingerprints, and the second fingerprint data may include a second group of fingerprints. The fingerprint-matching server 106 can determine that the first group of fingerprints match the second group of fingerprints upon determining that a similarity between each of the query fingerprints and each of the respective reference fingerprints satisfies a predetermined threshold associated with a Tanimoto distance measurement, a Manhattan distance measurement, and/or other distance measurements associated with matching images or other visual-based content.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. By way of example, responsive to determining that a fingerprint of the second fingerprint data matches multiple fingerprints of the first fingerprint data, the fingerprint-matching server 106 can (i) identify a fingerprint feature that differs as between the multiple fingerprints of the first fingerprint data and (ii) determine that a fingerprint of the second fingerprint data matches just one of the multiple fingerprints as to the identified fingerprint feature. Identifying the fingerprint feature can involve (i) referring to data that indicates a region of a frame that is channel specific to determine a region that is channel specific and (ii) identifying as the fingerprint feature a fingerprint feature corresponding with the determined region. The determined region can include a video frame edge or a region where channel identification is presented, for instance.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content-modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B with at least a portion of a different advertisement segment that is perhaps more targeted to the end-user. As another example, it can be desirable for the content-presentation device 104 to overlay on at least a portion of the AD SEGMENT B, overlay content that enhances at least a portion of the AD SEGMENT B in a way that is again perhaps more targeted to the end-user.

During a time-period T31, the content-presentation device 104 can generate fingerprint data representing the fifth content. This fingerprint data is referred to herein as "fifth fingerprint data." The content-presentation device 104 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The content-presentation device 104 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content-presentation device 104 can establish the synchronous lock using any synchronous lock technique now known or later developed. By way of example, the fingerprint-matching server 106 can transmit, to the content-presentation device 104, at least a portion of the third fingerprint data, and the content-presentation device 104 can increase the frame rate at which the content-presentation device 104 generates the fifth fingerprint data. The content-presentation device 104 can then use the third and fifth fingerprint data—namely, the time-stamps at which the third and fifth fingerprint data were generated—as a basis to establish synchronous lock (e.g., a time offset) between (i) true time defined along a timeline within the content being transmitted by the content-distribution system 102 and (ii) client time defined according to a clock of the content-presentation device 104. As another example, the fingerprint-matching server 106 can establish synchronous lock as described above and then inform the content-presentation device 104.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B with the AD SEGMENT D. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B, thereby modifying it to AD SEGMENT B'. As a result, rather than outputting for presentation the RECEIPT SEQUENCE 304, the content-presentation device can instead output for presentation the SECOND MODIFIED SEQUENCE 308.

In some examples, the content-presentation device 104 can perform an entirety of a content-modification operation (e.g., a replacement or overlay action, as described above) while tuned to the channel on which the RECEIPT SEQUENCE 304 is received, unless an intervening event occurs that might cause the content-modification operation (or the output of the resulting content) to be stopped, such as a channel change or a powering down of the content-presentation device 104 and/or associated display device. Thus, the FIRST MODIFIED SEQUENCE 306 or the SECOND MODIFIED SEQUENCE 308 can be output on the same channel on which the content-presentation device 104 is tuned—that is, the channel on which the modifiable content-segment is received and on which the content-modification opportunity was identified.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Operations Related to Volume-Level Detection.

Advertisers who pay for advertising segments, whether as part of an original content sequence or as replacement content as described above (or both), may prefer to have some indication or measure of user interest in the advertising segments. The term "user" in this context refers to a user (sometimes called a viewer) of a particular content-presentation device. Advertisers may particularly want to know which advertisements users have ignored (and when), as well as which ones users pay attention to (and when). Although detecting that a user has tuned away from a channel on which one or more particular advertisements are being presented may offer an indication of user disinterest, it may additionally or alternatively indicate that the user is more interested in the content of a different channel. For at least this reason, channel changes alone may be a deficient metric of user interest in advertising segments.

In accordance with example embodiments, audio volume levels of a content-presentation device 104 before, during, and possibly after content presentation may be used to gauge user interest in one or more advertising segments. In particular, by analyzing audio volume levels of a content-presentation device that have been measured before, during, and possibly after presentation of advertising segments on a given channel, while also determining that the content-presentation device has remained tuned to the given channel, a more reliable indication of user interest than channel-switching may be obtained.

More particularly, the content-presentation device 104 may detect and/or monitor audio volume levels during content presentation, and provide the audio-level information to a one or another server in the content-modification system 100. Further, applying techniques described above, for example in connection with the hot match operation in time-period T33, the content-modification system may also be able to determine or confirm that the content-presentation device has remained tuned to a given channel at least over a specific time interval. With its available knowledge of programming scheduling, including broadcast advertising segments, replaceable advertising segments, and replacement advertising segments, the content-modification system may thus correlate audio volume levels reported by the content-presentation device with specific programming segments, and advertising segments in particular. Then, by comparing volume settings at different points during one or more consecutive advertising segments, the content-modification system can determine when a user has turned the volume down during an advertising segment, indicating disinterest, or turned the volume up during an advertising segment, indicating interest. There may be additional or alternative ways that the content-modification system can determine that the content-presentation device has remained tuned to the given channel over the specific time interval. For example, the content-presentation device may provide channel information with the audio volume level information reported to the content-modification system. There may be other ways as well.

Various scenarios of advertising segment sequencing and volume-level detection are possible, providing different indications and/or types of indications of user interest and/or disinterest. Some example scenarios are considered below. However, it should be understood that other scenarios are possible, and that the ones presented here are not limiting, nor do they exhaust the possible ways in which volume-level monitoring can be determined or inferred to indicate user interest and/or disinterest in advertising content. In the example scenarios, it may be assumed that the content-modification system has determined, or can determine, that the content-presentation device remains tuned to a given channel on which the various program segments are scheduled during a time interval in which the various volume levels are monitored and reported by the content-presentation device. As such, it may be assumed that the content-modification system knows that the reported volume levels apply to a particular sequence of segments on the same (i.e., the given) channel.

In an example scenario, programming content may include two consecutive advertising segments, SA and SB, during which advertisements Ad A and Ad B are respectively scheduled, and of which segment SA is identified as a replaceable (e.g., modifiable) segment. For various reasons, the content-modification system may decide not to replace advertisement A, even though SA is a replacement opportunity. If the content-modification system determines that the audio volume of the content-presentation device is non-zero (and positive) at a prior time just before Ad A is presented (in SA), and then, at a prior time just before SB, the content-modification system determines from the content-presentation device that the volume is set to zero, the content-modification system may then be able to conclude that the volume was reduced during Ad A because of user disinterest in Ad A. In an example embodiment, the prior times for determining the audio volume could be 3-4 seconds before presentation of Ad A and/or Ad B. Other prior or "lead" times could be used as well.

In a similar scenario, Ad A may be replaced during SA by a replacement advertisement, Ad C. If the content-modification system determines from the content-presentation device that the audio volume level is set to zero by the time Ad B was about to play in SB (at a prior time, as above), then the system may conclude that the user was not interested in Ad C. In addition to determining a lack of interest in an advertisement, the content-modification system can similarly also determine if there is interest in an advertisement. For example, if just prior to SA the volume level is set to zero, but by the time just prior to the start of SB the volume is no longer zero, the content-modification system may conclude that the user is interested in the advertisement presented during SA—either Ad A or Ad C in this example.

Figure 5:
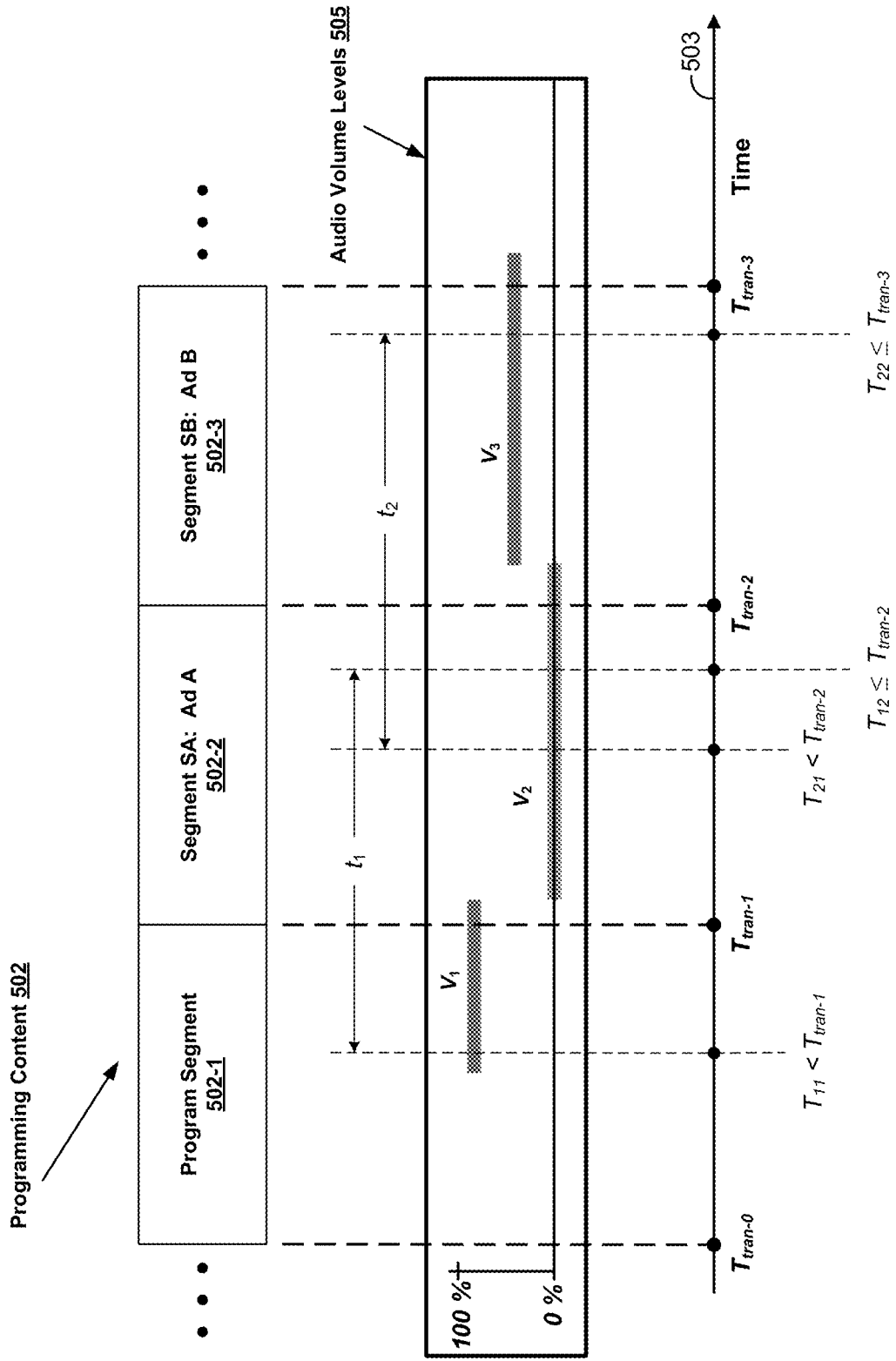
FIG. 5 illustrates an example of timing relationships of audio playout and volume levels, in accordance with example embodiments.

FIG. 5 illustrates an example of timing relationships of audio playout and volume levels on a content-presentation device, in accordance with example embodiments. By way of example, programming content 502 may include a program segment 502-1, followed immediately by an ad segment SA 502-2, and an ad segment SB 502-3 that immediately follows SA 502-1. In practice, there may be additional segments before program segment 502-1 and after SB 502-3, as indicated by the horizontal ellipses. For purposes of this illustration, the programming content 502 may be taken as being associated with a given channel on which the content-presentation device is receiving content over at least a time span represented in FIG. 5. In accordance with example embodiments, any one or more of the segments of the programming content 502 may be delivered to the content-presentation device on the given channel in a broadcast stream and/or provided out-of-broadcast as supplemental content for modification (e.g., replacement) of broadcast content on the given channel, as described above.

The timing and volume levels in FIG. 5 represent playout and audio volume level timing on the content-presentation device. In accordance with example embodiments, the volume and timing information may be measured or detected on the content-presentation device, and reported to a server or other component of a content-modification system for analysis, in order to estimate user/viewer interest in various advertising segments. In some example use cases, the analysis of timing and audio-volume data and estimates of user/viewer interest may be applied to advertising segments that are also supplemental (e.g., replacement or overlay content). In other example use cases, application may be to advertising segments that are part of a broadcast stream, or to both replacement advertisements and in-broadcast advertising. It should also be understood that the techniques described may be more generally applicable to evaluation of user/viewer interest in other types of programming segments, besides advertising.

While the discussion of FIG. 5 generally focuses on audio volume levels of program segments, it should be understood that programming, such as programming content 502 and the included program segments, may also include a video component. For example, as discussed above, the content-presentation device may be a smart TV, a TV communicatively-coupled with a set-top box, a mobile phone, a laptop computer, a desktop computer, a tablet, or a media dongle, among other possibilities. Any of these devices may typically support presentation of TV programs, movies, and other non-limiting examples of audio/video media content.

A timeline 503 is shown at the bottom of FIG. 5, and audio volume levels 505 across time are represented graphically in the middle of the figure. By way of example, the audio levels 505 are represented as a percentage range for 0-100%. However, other metrics, such as decibels, could be used. As shown, program segment 502-1, SA 502-2, and SB 502-3 are played out sequentially on the content-presentation device, starting at time $T_{tran-0}$, which designates a transition time between a presumed (but not shown) segment immediately preceding segment 502-1. The transition between program segment 502-1 and SA 502-2 is designated $T_{tran-1}$, and the transition between SA 502-2 and SB 502-3 is designated $T_{tran-2}$. A transition between SB 502-3 and a presumed (but not shown) segment immediately following SB 502-3 is designated $T_{tran-3}$.

Three temporally sequential audio volume levels, $V_1$, $V_2$, and $V_3$, are shown, which, by way of example, are at a first non-zero, a positive level (e.g., $V_1$=80%), zero ($V_2$=0%), and a second non-zero, positive level ($V_3$=45%). These levels and their temporal intervals may be taken as settings or measurements of volume levels on the content-presentation device during playout of the programming content 502. For purposes of illustration, the temporal intervals may be specified in relation to the transition times between segments. More specifically, $V_1$ may be measured from at least as early as a time $T_{11}$ that precedes $T_{tran-1}$ up to $T_{tran-1}$, and $V_2$ may be measured from a time that follows $T_{tran-1}$ up to at least a time $T_{12}$ that is less than or equal to $T_{tran-2}$. In an example, $T_{11}$ may precede $T_{tran-1}$ by 10 seconds, and $T_{12}$ may follow $T_{tran-1}$ by 15 seconds. These times are just examples. The time between $T_{11}$ and $T_{12}$ defines a time interval $t_1$ that spans the transition time $T_{tran-1}$, and over which it may be determined that the content-presentation device remains tuned to the given channel. As such, comparison of $V_1$ and $V_2$ may be considered as applying to two different, consecutive segments associated with the same given channel.

Similarly, $V_2$ may be measured from at least as early as a time $T_{21}$ that precedes $T_{tran-2}$ up to $T_{tran-2}$, and $V_3$ may be measured from a time that follows $T_{tran-2}$ up to at least a time $T_{22}$ that is less than or equal to $T_{tran-3}$. In an example, $T_{21}$ may precede $T_{tran-2}$ by 10 seconds, and $T_{22}$ may follow $T_{tran-2}$ by 15 seconds. Again, these times are just examples. The time between $T_{21}$ and $T_{22}$ defines a time interval $t_2$ that spans the transition time $T_{tran-2}$, and over which it may be determined that the content-presentation device again remains tuned to the given channel. As such, comparison of $V_2$ and $V_3$ may again be considered as applying to two different, consecutive segments associated with the same given channel.

The definitions above of $t_1$ and $t_2$, including the times marking their beginning and ending points, are somewhat formal, in the sense that they treat the volume-level comparison of program segment 502-1 to SA 502-2 separately from that of SA 502-2 to SB 502-3. The definitions are also specified such that the volume levels are associated with consecutive programming segments of the same given channel. In practice, the volume-level detections (or measurements) may be carried out continuously or at particular points during playout of the sequential segments, and then reported to the content-modification system in such a manner and/or with sufficient information to determine that the volume levels correspond to identifiable content segments on a common given channel. In addition, it should be understood that there may be other formal expressions of time intervals that also correspond to measuring and reporting volume levels associated with consecutive programming segments of the same given channel.

The example illustrated in FIG. 5 of the detected shift from $V_1$ to $V_2$ may correspond to the scenario described above in which the volume drop from non-zero to zero over the course of Ad A playout is taken as an indication of disinterest in Ad A. Similarly, the detected shift from $V_2$ to $V_3$ may correspond to the scenario described above in which the volume increase from zero to non-zero over the course of Ad B playout is taken as an indication of disinterest in Ad B. It should be evident that the particular examples illustrated in FIG. 5 are not limiting, and that the form of the volume-timing diagram shown may be generalized and extended to illustrate other scenarios in which volume changes across program segments and transitions between them may be used as indicators of user/viewer interest.

In accordance with example embodiments, a comparison of volume levels of adjacent advertisement segments may be used to define or set a parameter referred to herein as a "volume factor." A volume factor could be a binary indicator of "volume up" or "volume down," or could include additional information, such as direction of volume change and amount. Further information in the volume factor could be a score for ranking a "severity" of a volume change. For example, a change from a high level, such as 80% of a maximum level, to zero might correspond to a high negative score, and be associated with strong disinterest on the part of a user/viewer. Conversely, a change from zero to high volume level could correspond to a high positive score, and be associated with strong interest. The volume factor could thus score various degrees of volume change, and be associated with varying degrees of presumed or inferred user/viewer interest.

As noted, the analysis of volume levels may be applied to both advertisements that are part of an original content sequence and advertisements that are shown during segment replacement events. Advantageously, a content distribution service provider employing these techniques, illustrated by way of example above, may provide disinterest/interest information to advertisers as a valuable service. The content-modification system may also aggregate such interest/disinterest information over various user distribution metrics, such as demographic variables of regions and ages (if and when known), and further enhance the value of this information to advertisers. For instance, if a particular demographic seems to turn down the volume during a particular advertisement, an advertiser may want to consider why and/or select alternative advertisements to provide to that demographic. Conversely, determination that a particular demographic tends to turn up the volume during a particular advertisement may also be useful information. Other non-limiting examples of demographic variables may include personal interests, education, and hobbies. It should be understood that such information may be available to a content-modification system on a user-by-user consent basis or other basis that ensures and preserves privacy.

In accordance with example embodiments, the monitored volume levels may be reported by the content-presentation device 104 to a server in the content-modification system 100, such as the content-management system 108 or the data-management system 110. The server that receives the volume information may then carry out the analyses described herein, or pass the information to another server or device that may be external to the content-modification system 100. The server that carries out the analyses could also provide the results directly to advertisers, or save the results in a database or other intermediate storage for later delivery to one or more advertisers.

In another example, if the same advertisement is scheduled to be shown to the same content-presentation device a preset number of times (e.g., five), and it is determined by one or another of the above example techniques that the user is not interested in the advertisement (e.g., by detecting disinterest once or twice), the advertiser or the content-modification system may decide to forgo showing the advertisement for the third, fourth, and fifth times, and instead use a different advertisement. This decision could be made by the advertiser, or by the content-modification system by pre-arranged and agreed-upon scheduling algorithm, for example.

Various analytical techniques may be used to evaluate one or more statistical correlations between volume changes associated with particular advertisements and demographic variables. Generally, comparisons of volume levels across transitions between program segments may serve as a metric of interest in one or both adjacent program segments. Statistical analyses may then provide indications of how interest metrics correlate (or not) with one or more demographic variables. Correlations may also take account of time of day and/or other day/date information, such as seasons, holidays, and so on.

In accordance with example embodiments, content-presentation devices may employ a variety of procedures or operations for monitoring and reporting audio volume information. The content-presentation device may include executable instructions (e.g., software, hardware, and/or firmware) for monitoring audio volume level settings at various time instants, and reporting them to the content-modification system. For example, the content-presentation device may monitor and report audio levels during time intervals that span segment transitions, such as just prior to a switch from a regular programming to an advertising segment, just prior to a switch from an advertising segment to a regular programming, or just prior to a switch from one advertising segment to another. Similarly, the content-presentation device may monitor and report audio levels just after segment transitions. The content-presentation device may further operate to report audio levels together with channel information, or without it, as described above.

Some content presentation devices may make audio information directly available to a content-modification system. Others may process audio signals provided by external devices, such as set-top boxes, and then determine the audio volume information based on the signal processing.

IV. Example Methods

Figure 6:
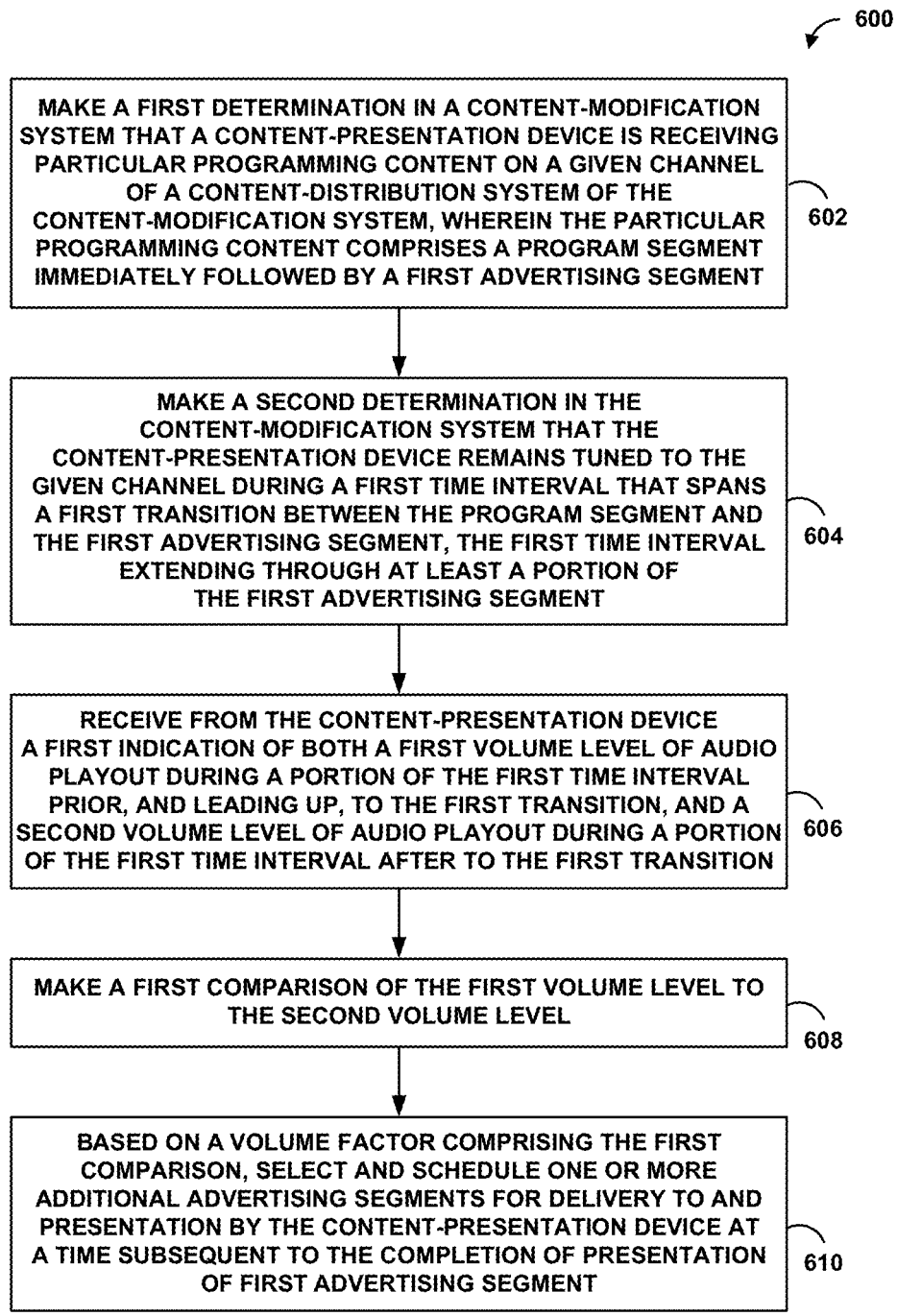
FIG. 6 is a flow chart of an example method.

FIG. 6 is a flow chart of an example method 600 of volume-level detection, such as that described above. The example method 600 illustrates operations carried out by the content-management system 108 and/or the supplemental-content delivery system 112, for example.

Example method 600 could be implemented on and/or carried out by a computing system, such as computing system 200 described above. Non-limiting examples of such computing system include the content-management system 108 and/or the supplemental-content delivery system 112, for example. In particular, the example method 500 could be implemented on and/or carried out by the content-management system 108 and/or the supplemental-content delivery system 112 that may include one or more processors, and a non-transitory computer-readable storage medium having stored thereon program instructions that, upon execution by the one or more processors, cause the content-management system 108 and/or the supplemental-content delivery system 112 to carry out operations including operations of example method 600.

At block 602, the method 600 includes making a first determination in a content-modification system that a content-presentation device is receiving particular programming content on a given channel of a content-distribution system of the content-modification system. The particular programming content may have at least an audio-content component and may include a program segment immediately followed by a first advertising segment. Referring again to FIG. 5, the particular programming content could correspond to programming content 502, and the program segment and first advertising segment could correspond to program segment 502-1 and SA 502-2, for example.

At block 604, the method 600 includes making a second determination in the content-modification system that the content-presentation device remains tuned to the given channel during a first time interval that spans a first transition between the program segment and the first advertising segment. The first time interval may extend through at least a portion of the first advertising segment. Referring again to FIG. 5, the first time interval could correspond to $t_1$, for example.

At block 606, the method 600 includes receiving from the content-presentation device a first indication of both a first volume level of audio playout during a portion of the first time interval prior, and leading up, to the first transition, and a second volume level of audio playout during a portion of the first time interval after to the first transition. Referring once more to FIG. 5, the first time interval could correspond to $t_1$, the portion of the first time interval prior, and leading up, to the first transition could correspond to the time between $T_{11}$ and $T_{tran-1}$, and the portion of the first time interval after to the first transition could correspond to the time between $T_{tran-1}$ and $T_{12}$, for example. The first and second volume levels could correspond to $V_1$ and $V_2$, for example.

At block 608, the method 600 includes making a first comparison of the first volume level to the second volume level.

Finally, at block 610, the method 600 includes, based on a volume factor comprising the first comparison, selecting and scheduling one or more additional advertising segments for delivery to and presentation by the content-presentation device at a time subsequent to the completion of presentation of first advertising segment. The comparison may also be used for other selection and/or scheduling decisions. In example embodiments, the comparison could include an indication of whether the volume increased or decreased, and by how much, for example.

In accordance with example embodiments, the example method 600 may further include operations relating to a second advertising segment immediately following the first advertising segment. The further operations may involve making a third determination in the content-modification system that the particular programming content further comprises the second advertising segment immediately following the first advertising segment. A fourth determination may be made in the content-modification system that the content-presentation device remains tuned to the given channel during a second time interval that spans a second transition between the first advertising segment and the second advertising segment, the second time interval extending through at least a portion of the second advertising segment. The further operations may also involve receiving from the content-presentation device a second indication of both a third volume level of audio playout during a portion of the second time interval prior, and leading up, to the second transition, and a third volume level of audio playout during a portion of the time interval after to the second transition. A second comparison of the second volume level to the third volume level may then be made. The volume factor could further include the second comparison Referring again to FIG. 5, the second time interval could correspond to $t_2$, the portion of the second time interval prior, and leading up, to the second transition could correspond to the time between $T_{21}$ and $T_{tran-2}$, and the portion of the second time interval after to the second transition could correspond to the time between $T_{tran-2}$ and $T_{22}$, for example. The third volume level could correspond to $V_3$, for example.

In accordance with example embodiments, the first advertising segment may be a scheduled broadcast advertisement, or replacement content downloaded by the content-presentation device prior to the first transition.

In accordance with example embodiments, the first advertising segment may be a first scheduled broadcast advertisement, or first replacement content downloaded by the content-presentation device prior to the first transition. Similarly, the second advertising segment may be a second scheduled broadcast advertisement, or second replacement content downloaded by the content-presentation device prior to the second transition.

In accordance with example embodiments, the first volume level may be non-zero and positive, and the second volume level may be zero. In this case, the volume factor might signal or be associated with low (inferred) interest on the part of a user/viewer of the content-presentation device. Consequently, selecting and scheduling the one or more additional advertising segments for delivery to and presentation by the content-presentation device at the time subsequent to the completion of presentation of first advertising segment may involve flagging the first advertising segment for omission from scheduling during at least one subsequent content-modification opportunity on the content-presentation device.

In accordance with example embodiments, the first volume level may be zero, and the second volume level may be non-zero and positive. In this case, the volume factor might signal or be associated with high (inferred) interest on the part of a user/viewer of the content-presentation device. Consequently, selecting and scheduling the one or more additional advertising segments for delivery to and presentation by the content-presentation device at the time subsequent to the completion of presentation of first advertising segment comprises flagging the first advertising segment for scheduling during at least one subsequent content-modification opportunity on the content-presentation device, and/or for retaining a previously scheduled subsequent content-modification opportunity on the content-presentation device.

In accordance with example embodiments, the content-presentation device may be a smart TV, a TV communicatively-coupled with a set-top box, a mobile phone, a laptop computer, a desktop computer, a tablet, or a media dongle. In addition the particular programming content includes a video component and wherein the particular programming content may include a video component.

In accordance with example embodiments, the example method 600 may be applied to multiple content-presentation devices in order to derive one or more correlations between volume factors of the multiple content-presentation devices and one or more demographic variables. More particularly, the content-presentation device may be one of a plurality of different content-presentation devices, each of which is respectively associated with assigned values for a set of demographic variables. The set of demographic variables may defined in common for all of the plurality of content-presentation devices. For example, the set of demographic variables could include geographic location and age of the user/viewer. Each of the plurality of content-presentation devices may then have its own respective values assigned to the demographic variables. With multiple content-presentation devices, making the first determination may entail determining that each of the different content-presentation devices is receiving the particular programming content on the given channel of the content-distribution system of the content-modification system. Further, making the second determination may entail determining that each of the different content-presentation devices remains tuned to the given channel during a respective first time interval that spans a respective first transition between the program segment and the first advertising segment. The respective first time interval may extend through at least a portion of the first advertising segment. Additionally, receiving from the content-presentation device the first indication may involve receiving from each of the different content-presentation devices a respective first indication of both a respective first volume level of respective audio playout during a respective portion of the respective first time interval prior, and leading up, to the respective first transition, and a respective second volume level of respective audio playout during a respective portion of the respective first time interval after to the respective first transition. Then, making the first comparison may involve making a respective comparison of the respective first volume level to the respective second volume level for each of the different content-presentation devices.

In accordance with example embodiments, the example method in the multiple content-presentation device case may further include computationally determining one or more statistical correlations between the respective comparisons and one or more of the demographic variables.

As note, example method 600 may be carried out by a content-modification system, or a computing device of such as system. As also described above, some operations of volume-level detection may be carried out by a content-presentation device. Extension of these operations to corresponding example methods is straightforward.

V. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
making a first determination in a content-modification system that a content-presentation device is receiving particular programming content on a given channel of a content-distribution system of the content-modification system, wherein the particular programming content has at least an audio-content component and comprises a program segment immediately followed by a first advertising segment;
making a second determination in the content-modification system that the content-presentation device remains tuned to the given channel during a first time interval that spans a first transition between the program segment and the first advertising segment, the first time interval extending through at least a portion of the first advertising segment;
receiving, from the content-presentation device, a first indication of both a first volume level of audio playout during a portion of the first time interval prior, and leading up, to the first transition, and a second volume level of audio playout during a portion of the first time interval after to the first transition;
making a first comparison of the first volume level to the second volume level;
determining one or more statistical correlations between the first comparison and a set of demographic variables associated with the content-presentation device; and
based on a volume factor comprising the first comparison and the one or more statistical correlations, selecting and scheduling one or more additional advertising segments for delivery to and presentation by the content-presentation device at a time subsequent to completion of presentation of the first advertising segment.

2. The method of claim 1, further comprising:
making a third determination in the content-modification system that the particular programming content further comprises a second advertising segment immediately following the first advertising segment;
making a fourth determination in the content-modification system that the content-presentation device remains tuned to the given channel during a second time interval that spans a second transition between the first advertising segment and the second advertising segment, the second time interval extending through at least a portion of the second advertising segment;
receiving, from the content-presentation device, a second indication of both a third volume level of audio playout during a portion of the second time interval prior, and leading up, to the second transition, and a third volume level of audio playout during a portion of the time interval after to the second transition; and
making a second comparison of the second volume level to the third volume level, wherein the volume factor further comprises the second comparison.

3. The method of claim 1, wherein the first advertising segment is one of a scheduled broadcast advertisement, or replacement content downloaded by the content-presentation device prior to the first transition.

4. The method of claim 2, wherein the first advertising segment is one of a first scheduled broadcast advertisement, or first replacement content downloaded by the content-presentation device prior to the first transition, and wherein the second advertising segment is one of a second scheduled broadcast advertisement, or second replacement content downloaded by the content-presentation device prior to the second transition.

5. The method of claim 1, wherein the first volume level is non-zero and positive, and the second volume level is zero, and wherein, based on the volume factor comprising the first comparison, selecting and scheduling the one or more additional advertising segments for delivery to and presentation by the content-presentation device at the time subsequent to the completion of presentation of the first advertising segment comprises flagging the first advertising segment for omission from scheduling during at least one subsequent content-modification opportunity on the content-presentation device.

6. The method of claim 1, wherein the first volume level is zero, and the second volume level is non-zero and positive, and wherein, based on the volume factor comprising the first comparison, selecting and scheduling the one or more additional advertising segments for delivery to and presentation by the content-presentation device at the time subsequent to the completion of presentation of the first advertising segment comprises flagging the first advertising segment for at least one of (i) scheduling during at least one subsequent content-modification opportunity on the content-presentation device, or (ii) retaining a previously scheduled subsequent content-modification opportunity on the content-presentation device.

7. The method of claim 1, wherein the content-presentation device is one of a smart TV, a TV communicatively-coupled with a set-top box, a mobile phone, a laptop computer, a desktop computer, a tablet, or a media dongle, and wherein the particular programming content includes a video component.

8. The method of claim 1, wherein the content-presentation device is one of a plurality of different content-presentation devices, each of which is respectively associated with assigned values for the set of demographic variables, the set of demographic variables being defined in common for all of the plurality of content-presentation devices,
  wherein making the first determination comprises determining that each of the different content-presentation devices is receiving the particular programming content on the given channel of the content-distribution system of the content-modification system,
  wherein making the second determination comprises determining that each of the different content-presentation devices remains tuned to the given channel during a respective first time interval that spans a respective first transition between the program segment and the first advertising segment, the respective first time interval extending through at least a portion of the first advertising segment,
  wherein receiving, from the content-presentation device, the first indication comprises receiving, from each of the different content-presentation devices, a respective first indication of both a respective first volume level of respective audio playout during a respective portion of the respective first time interval prior, and leading up, to the respective first transition, and a respective second volume level of respective audio playout during a respective portion of the respective first time interval after to the respective first transition, and
  wherein making the first comparison comprises making a respective comparison of the respective first volume level to the respective second volume level for each of the different content-presentation devices.

9. The method of claim 8, further comprising computationally determining one or more statistical correlations between the respective comparisons and one or more of the demographic variables.

10. A computing system of a content-modification system, the computing system comprising:
  a processor; and
  a non-transitory computer-readable storage medium, having stored thereon program instructions that, upon execution by the processor, cause performance of a set of operations including:
    making a first determination that a content-presentation device is receiving particular programming content on a given channel of a content-distribution system of the content-modification system, wherein the particular programming content has at least an audio-content component and comprises a program segment immediately followed by a first advertising segment;
    making a second determination that the content-presentation device remains tuned to the given channel during a first time interval that spans a first transition between the program segment and the first advertising segment, the first time interval extending through at least a portion of the first advertising segment;
    receiving, from the content-presentation device, a first indication of both a first volume level of audio playout during a portion of the first time interval prior, and leading up, to the first transition, and a second volume level of audio playout during a portion of the first time interval after to the first transition;
    making a first comparison of the first volume level to the second volume level;
    determining one or more statistical correlations between the first comparison and a set of demographic variables associated with the content-presentation device; and
    based on a volume factor comprising the first comparison and the one or more statistical correlations, selecting and scheduling one or more additional advertising segments for delivery to and presentation by the content-presentation device at a time subsequent to completion of presentation of the first advertising segment.

11. The computing system of claim 10, wherein the operations further include:
  making a third determination in the content-modification system that the particular programming content further comprises a second advertising segment immediately following the first advertising segment;
  making a fourth determination in the content-modification system that the content-presentation device remains tuned to the given channel during a second time interval that spans a second transition between the first advertising segment and the second advertising segment, the second time interval extending through at least a portion of the second advertising segment;
  receiving, from the content-presentation device, a second indication of both a third volume level of audio playout during a portion of the second time interval prior, and leading up, to the second transition, and a third volume level of audio playout during a portion of the time interval after to the second transition; and
  making a second comparison of the second volume level to the third volume level, wherein the volume factor further comprises the second comparison.

12. The computing system of claim 10, wherein the first advertising segment is one of a scheduled broadcast advertisement or replacement content downloaded by the content-presentation device prior to the first transition.

13. The computing system of claim 12, wherein the first advertising segment is one of a first scheduled broadcast advertisement or first replacement content downloaded by the content-presentation device prior to the first transition, and wherein the second advertising segment is one of a second scheduled broadcast advertisement, or second replacement content downloaded by the content-presentation device prior to the second transition.

14. The computing system of claim 10, wherein the first volume level is non-zero and positive, and the second volume level is zero, and
  wherein, based on the volume factor comprising the first comparison, selecting and scheduling the one or more additional advertising segments for delivery to and presentation by the content-presentation device at the time subsequent to the completion of presentation of the first advertising segment comprises flagging the first advertising segment for omission from scheduling during at least one subsequent content-modification opportunity on the content-presentation device.

15. The computing system of claim 10, wherein the first volume level is zero, and the second volume level is non-zero and positive, and wherein, based on the volume factor comprising the first comparison, selecting and scheduling the one or more additional advertising segments for delivery to and presentation by the content-presentation device at the time subsequent to the completion of presentation of the first advertising segment comprises flagging the first advertising segment for at least one of (i) scheduling during at least one subsequent content-modification opportunity on the content-presentation device, or (ii) retaining a previously scheduled subsequent content-modification opportunity on the content-presentation device.

16. The computing system of claim 10, wherein the content-presentation device is one of a smart TV, a TV communicatively-coupled with a set-top box, a mobile phone, a laptop computer, a desktop computer, a tablet, or a media dongle, and wherein the particular programming content includes a video component.

17. The computing system of claim 10, wherein the content-presentation device is one of a plurality of different content-presentation devices, each of which is respectively associated with assigned values for the set of demographic variables, the set of demographic variables being defined in common for all of the plurality of content-presentation devices,
   wherein making the first determination comprises determining that each of the different content-presentation devices is receiving the particular programming content on the given channel of the content-distribution system of the content-modification system,
   wherein making the second determination comprises determining that each of the different content-presentation devices remains tuned to the given channel during a respective first time interval that spans a respective first transition between the program segment and the first advertising segment, the respective first time interval extending through at least a portion of the first advertising segment,
   wherein receiving, from the content-presentation device, the first indication comprises receiving, from each of the different content-presentation devices, a respective first indication of both a respective first volume level of respective audio playout during a respective portion of the respective first time interval prior, and leading up, to the respective first transition, and a respective second volume level of respective audio playout during a respective portion of the respective first time interval after to the respective first transition, and
   wherein making the first comparison comprises making a respective comparison of the respective first volume level to the respective second volume level for each of the different content-presentation devices.

18. The computing system of claim 17, wherein the operations further include computationally determining one or more statistical correlations between the respective comparisons and one or more of the demographic variables.

19. A non-transitory computer-readable storage medium having stored thereon program instructions that, upon execution by one or more processors of a computing system of a content-modification system, cause the computing system to carry out operations comprising:
   making a first determination that a content-presentation device is receiving particular programming content on a given channel of a content-distribution system of the content-modification system, wherein the particular programming content has at least an audio-content component and comprises a program segment immediately followed by a first advertising segment;
   making a second determination that the content-presentation device remains tuned to the given channel during a first time interval that spans a first transition between the program segment and the first advertising segment, the first time interval extending through at least a portion of the first advertising segment;
   receiving, from the content-presentation device, a first indication of both a first volume level of audio playout during a portion of the first time interval prior, and leading up, to the first transition, and a second volume level of audio playout during a portion of the first time interval after to the first transition;
   making a first comparison of the first volume level to the second volume level;
   determining one or more statistical correlations between the first comparison and a set of demographic variables associated with the content-presentation device; and
   based on a volume factor comprising the first comparison and the one or more statistical correlations, selecting and scheduling one or more additional advertising segments for delivery to and presentation by the content-presentation device at a time subsequent to completion of presentation of first advertising segment.

20. The non-transitory computer-readable storage medium of claim 19, wherein the content-presentation device is one of a plurality of different content-presentation devices, each of which is respectively associated with assigned values for the set of demographic variables, the set of demographic variables being defined in common for all of the plurality of content-presentation devices,
   wherein making the first determination comprises determining that each of the different content-presentation devices is receiving the particular programming content on the given channel of the content-distribution system of the content-modification system,
   wherein making the second determination comprises determining that each of the different content-presentation devices remains tuned to the given channel during a respective first time interval that spans a respective first transition between the program segment and the first advertising segment, the respective first time interval extending through at least a portion of the first advertising segment,
   wherein receiving, from the content-presentation device, the first indication comprises receiving, from each of the different content-presentation devices, a respective first indication of both a respective first volume level of respective audio playout during a respective portion of the respective first time interval prior, and leading up, to the respective first transition, and a respective second volume level of respective audio playout during a respective portion of the respective first time interval after to the respective first transition,
   wherein making the first comparison comprises making a respective comparison of the respective first volume level to the respective second volume level for each of the different content-presentation devices, and
   wherein the operations further comprise computationally determining one or more statistical correlations between the respective comparisons and one or more of the demographic variables.

* * * * *